United States Patent [19]

Baldwin

[11] 3,841,144
[45] Oct. 15, 1974

[54] SAND DETECTION PROBE
[75] Inventor: Willett F. Baldwin, Dallas, Tex.
[73] Assignee: Mobil Oil Corporation, New York City, N.Y.
[22] Filed: Oct. 12, 1972
[21] Appl. No.: 297,175

[52] U.S. Cl. .............................. 73/61 R, 340/239 R
[51] Int. Cl. ............................................ G01n 15/02
[58] Field of Search...... 73/61 R, 53, 54, 59, 194 B, 73/228, 71.5 U; 324/71 CP; 340/236, 239 R

[56] References Cited
UNITED STATES PATENTS
| | | | |
|---|---|---|---|
| 2,561,763 | 7/1951 | Waters et al. | 73/228 |
| 2,760,184 | 8/1956 | Beattie | 340/239 R |
| 3,557,616 | 1/1971 | Landon, Jr. et al. | 73/228 |
| 3,680,841 | 8/1972 | Yagi et al. | 73/71.5 UX |

FOREIGN PATENTS OR APPLICATIONS
884,231    12/1961    Great Britain ............... 73/194 B Primary Examiner—Richard C. Queisser
Assistant Examiner—Joseph W. Roskos
Attorney, Agent, or Firm—A. L. Gaboriault; Drude Faulconer

[57] ABSTRACT

A means for detecting the presence of particulate material, e.g., sand, in a fluid stream flowing through a conduit, said means comprising an acoustical probe which is positioned directly into the flow stream. The probe has a housing in which a transducer, e.g., piezoelectric crystal, is suspended. The housing is filled with oil to acoustically couple the transducer to the housing. Particulate material in the flow stream gives up kinetic energy upon striking the housing of the probe which in turn excites the transducer to generate an output signal having a frequency component which is representative of the particulate material.

20 Claims, 5 Drawing Figures

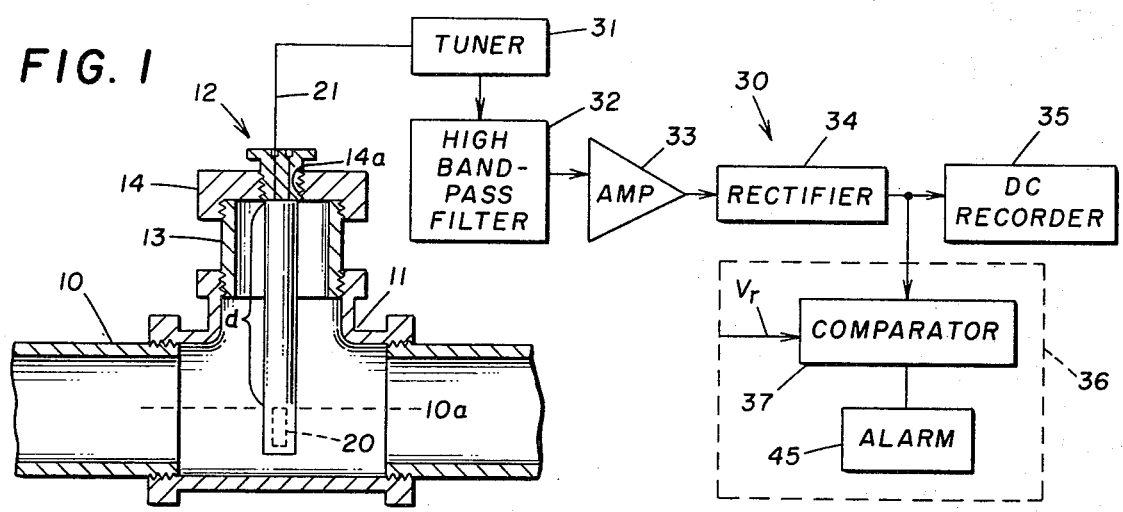
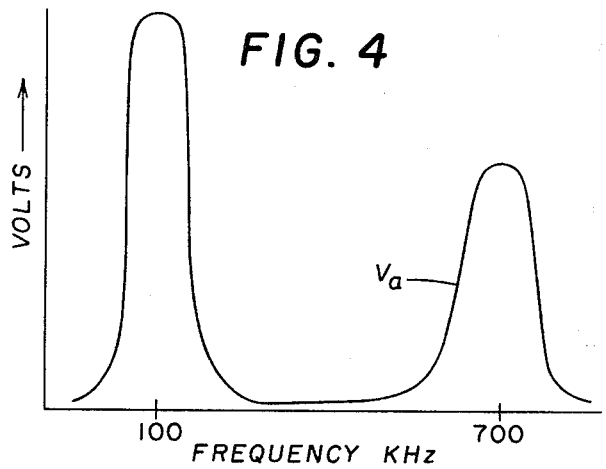
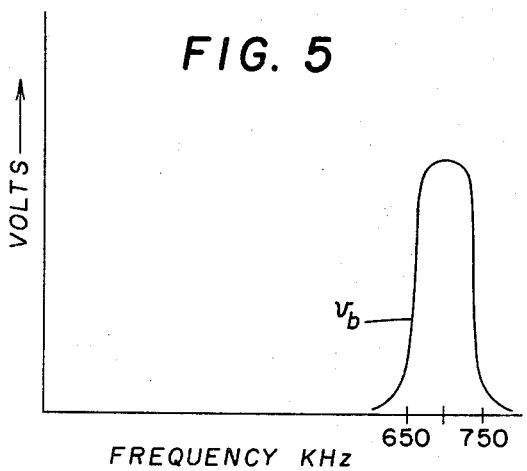
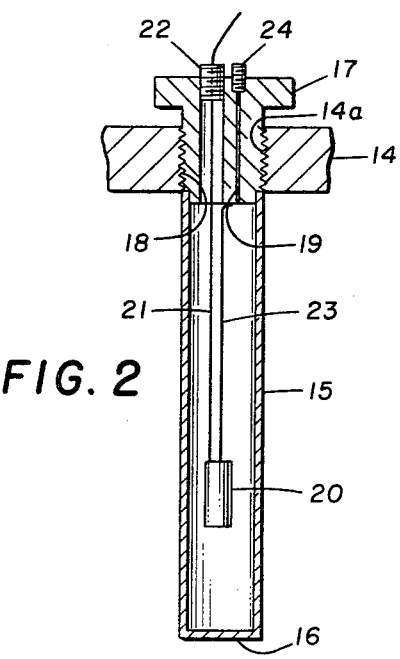
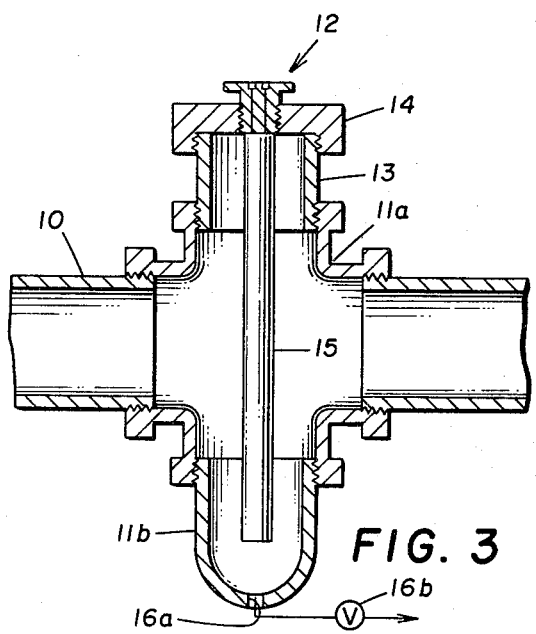

SAND DETECTION PROBE

BACKGROUND OF THE INVENTION

This invention relates to a means for detecting the presence of a particulate material in a fluid stream flowing through a conduit and more particularly to an acoustical probe means which is positioned directly in a production flow stream for indicating the presence of particulate material, e.g., sand, which is being produced along with products from an oil and/or gas well.

Fluid minerals, such as oil and gas, are often discovered in subterranean incompetent formations which are comprised of unconsolidated or loosely consolidated particulate material, e.g., sand. When these minerals are produced from said formations through a well to the surface, the loose or weakly bound sand particles are likely to become dislodged from the formation and become entrained in the produced fluids. These entrained particles not only can cause severe erosion of subsurface and surface production equipment, but they also tend to accumulate in field separators, flowlines, and storage tanks thereby necessitating the stopping of production in order to clean and repair the affected equipment. Where substantial volumes of sand are produced, the mere disposal of the sand amounts to still another problem, all of which add considerably to the expense of producing the minerals. Therefore, fluid production from an incompetent formation can result in substantially increased production and maintenance costs unless the production of sand from the formation can be controlled.

Various processes are available for treating incompetent formations, e.g., consolidating treatments, to control the flow of sand. However, these are expensive and are not always successful. A simpler and less expensive technique is to control the flow rate of the produced minerals so that the volume of sand produced therewith is maintained at an acceptable level, see U.S. Pat. No. 3,565,311 issued Feb. 16, 1971. To be assured that the sand production is maintained at the desired level, the produced fluid flow stream should be closely monitored for particulate content.

Presently, the most commonly used known technique for monitoring sand production in a production flow stream is merely to periodically check the amount of sand accumulated in the field separators and compare it with the actual fluid production for a given time interval. Besides having to stop or reroute the production stream while the separators are checked, this technique still does not provide the continuous monitoring of the production stream necessary to warn an operator of unexpected increased sand production when it actually occurs. In other words, by only periodically checking the sand production, damage may have already occurred before an operator becomes aware that a problem exists. Therefore, a need exists for some means to continuously monitor the production stream from a well and instantaneously indicate the presence or increased presence of particulate material in said stream.

Several different types of devices have been used or proposed for detecting the presence of sand in the produced fluids from a well. One such device monitors the flow stream to determine wear caused by sand entrained therein and is commonly referred to as an erosion probe. One type of erosion probe is one which is inserted directly in the flow stream where the sand will gradually erode through the probe wall at which time the pressure of the flow stream will actuate an alarm or the like to warn the operator that a certain amount of erosion has occurred. However, these devices still involve a time delay between increased sand production and the sounding of an alarm and do not provide a continuous monitoring of the sand content in the flow stream.

Another type of erosion probe is one which is coated with radioactive material and is positioned into the flow stream. The particulate material will erode away the radioactive material which, in turn, changes the radiation reading from the probe. This type of probe is disclosed in U.S. Pat. No. 3,678,273 issued July 18, 1972.

Other devices of this general type are known wherein an acoustical device is lowered down into a well to determine if flow is occurring into the wellbore and/or to determine the location within the wellbore that such flow may be occurring, e.g., see U.S. Pat. Nos. 2,210,417 issued Aug. 6, 1940; 2,396,935 issued Mar. 19, 1946; 3,509,764 issued May 5, 1970; and 3,563,311 issued Feb. 16, 1971. These devices, however, require that production be curtailed while the devices are lowered and operated down the well and accordingly they are unable to continuously monitor the particulate content of the produced fluid stream during normal production operations.

Still other acoustical devices are available which monitor a flow stream through a conduit, these being flow meters which operate on acoustical principles. One such flow meter is disclosed in U.S. Pat. No. 3,580,092 issued to T. J. Scarpa on May 25, 1971. This flow meter utilizes a piezoelectric crystal pickup element which is clamped onto the outside of the pipe to "listen" for fluid flow through the pipe and is basically a flow/no-flow indicator which can be calibrated under certain conditions to monitor the amount of fluid flowing through the pipe.

SUMMARY OF THE INVENTION

The present invention provides a means for continuously monitoring a flow stream in a conduit to indicate the presence or increased presence of particulate material, e.g., sand, in said flow stream.

More specifically, the present invention comprises an acoustical probe means which is positioned directly into the conduit through which the flow stream to be monitored flows. The probe means is preferably comprised of a thinwalled, elongated, cylindrical housing having a fitting at one end for positioning the housing directly in said conduit with the elongated axis of the housing being perpendicular to the flow stream. The housing, which is preferably coated with a thin layer of wear-resistant material, is attached only at one end to the conduit with its other end being free. An acoustical transducer is suspended within said housing by means of its output lead and ground. The output lead extends from the housing to a point outside the conduit. A passage is provided in the housing for filling the housing with a noncompressible, nonconductive fluid, e.g., oil. The oil effectively couples the transducer to the wall of the housing without allowing actual physical contact therebetween.

The acoustical transducer, e.g., piezoelectric crystal, has a primary resonant frequency in one of its modes in excess of the 100 kilohertz range, e.g., 700 kilohertz, thereby providing a proper response characteristic necessary for the detection of particulate material as will be further explained below in the detailed description of the invention.

When the probe means is positioned in the conduit, the flow stream directly strikes the outer surface of the oil-filled housing giving up kinetic energy which in turn causes the acoustical transducer within the housing to oscillate to generate a signal having frequency components representative of said kinetic energy. The output signal of the probe means may then be processed through circuitry which filters and amplifies the signal further to render it in some usable format. Although it forms no part of the present invention, specific circuitry is illustrated below. This circuitry, however, in combination with the present probe means forms the basis for copending application.

BRIEF DESCRIPTION OF THE DRAWINGS

FIG. 1 is an elevated view, partly in section, of the probe means of the present invention along with a block diagram of the circuitry which can be used to process the signal from the probe means;

FIG. 2 is an enlarged, sectional view of the probe means of FIG. 1;

FIG. 3 is an elevated view, partly in section, of a modified mounting for the probe means of FIG. 1;

FIG. 4 is a graphic representation of the tuned response curve of the transducer of the probe means in FIG. 2; and FIG. 5 is a graphic representation of the output signal of the transducer after it has passed through the filter of FIG. 1.

DESCRIPTION OF THE PREFERRED EMBODIMENTS

Referring more particularly to the drawings, FIG. 1 discloses a conduit 10 which is adapted to carry a fluid flow stream which is to be monitored continuously in accordance with the present invention. Conduit 10 is preferably one which connects the wellhead of a producing oil and/or gas well with surface production equipment, e.g., a separator. Access into conduit 10 is provided by means of tee 11 which forms part of conduit 10, extension pipe 13, and cap 14 which has threaded opening 14a therethrough, all clearly shown in FIG. 1. Particulate material detection probe means 12 is positioned directly into conduit 10 through opening 14a and is affixed to cap 14 by means of mating threads or the like.

Particulate material detection probe means 12 (FIG. 2) is comprised of an elongated, cylindrical housing 15 which is closed at one end 16. It is important to make this housing as thin-walled as possible while still maintaining adequate structural integrity so that the response of housing 15 to impinging material will be as great as possible. Further, it is preferred to coat the external surface of housing 15 with a thin layer of wear-resistant material, e.g., titanium carbide, (not shown) to extend the operational life of probe means 12. Plug means 17 having two passages 18, 19 therethrough is affixed to the other end of housing 15 to seal same. Plug 17 is externally threaded for securing probe means 12 in opening 14a of cap 14. It is noted that probe means 12 is attached to conduit 10 only at one end so that housing 15 is free to vibrate when struck by the flow stream.

Transducer 20 is suspended in housing 15 by means of its signal output lead 21 which passes through electrical connector 22 in opening 18 and by its ground lead 23 which is attached to plug 17 as shown in FIG. 2. Opening 19 through plug 17, which is normally sealed by threaded plug 24, provides a passage for filling housing 15 with a noncompressible, nonconductive fluid (not shown), e.g., oil. Transducer 20 is positioned within housing 15 in such a way that it hangs suspended therein and does not touch the housing wall or bottom and is acoustically coupled to housing 15 only by means of the oil in the housing.

When probe means 12 is in place and flow is taking place through conduit 10, the flow stream will strike directly onto the wall of hosuing 15. When conduit 10 is horizontal, it is preferred that transducer 20 extends into housing 15 for that distance $d$ (FIG. 1) which is necessary to insure that transducer 20 will be positioned in the lower portion of conduit 10 (below line 10a) when probe means 12 is in an operable position within conduit 10. This is done so that transducer 20 will be effectively positioned in the path of the main concentration of sand in the flow stream which normally occurs in the lower portion of conduit 10 due to natural gravitational forces. To insure that such positioning is possible in smaller diameter conduits, alternate structure for mounting probe 12 in conduit 10 is shown in FIG. 3. Cross 11a replaces tee 11 of FIG. 1 and a bull plug 11b or the like is used to provide greater vertical area in conduit 10 for mounting probe means 12. Valve 16b is connected to opening 16a in bull plug 11b to periodically bleed off any sand that may become trapped in plug 11b. Also by extending probe means 12 into bull plug 11b, if housing 15 should break, it becomes jammed between extension pipe 13 and bull plug 11b and is not carried off by the flow stream to cause possible damage to valves, separators, or other downstream equipment. 11b Transducer 20 is preferably a piezoelectric crystal having its output signal tuned to the primary resonant frequency of one of its modes. This provides a peaked output signal at said tuned frequency while most other in said output signal are attenuated. For the detection of particulate material, this primary resonant frequency has to be above 100 kilohertz range as will be more fully described below. By tuning transducer 20 to a primary resonant frequency, the transducer responds rapidly to the frequencies generated when kinetic energy is given up by the particulate material impinging on oil-filled housing 15, and, in turn, produces a signal indicative thereof. The output of transducer means 20 is fed through lead 21 into processing circuitry 30 (FIG. 1) to convert the signal to some usable format.

A more complete understanding of the present invention may be had by referring to the following specific example. Housing 15 of probe means 12 comprises a three-fourths inch diameter, stainless steel tube having a wall thickness of 0.049 inch. The external wall of the tube is coated with a 0.0005-inch layer of titanium carbide by means of a commercially available process. A piezoelectric, ceramic crystal in the shape of a circular disc (e.g., Vernitron PTZ-5), having a 0.5-inch diameter and a 0.1-inch thickness forms transducer 20 and is assembled into probe means 12 as described above. Housing 15 is filled with oil through opening 19 to acoustically couple the transducer to the housing without allowing physical contact between the two.

The particular piezoelectric crystal 20 was selected because its primary resonant frequency in one of its modes, i.e., the thickness mode, is approximately 700 kilohertz which is well above the minimum 100 kilohertz frequency range required for positive detection of particulate material in the flow stream. When the output of crystal 20 is tuned by means of tuner 31 to primary resonant frequency of 700 kilohertz, the typical voltage response $v_a$ of crystal 20 approximates the curve illustrated in FIG. 4.

It will be noted that the response curve of the particular crystal selected shows two resonant frequencies, one at approximately 100 kilohertz which occurs in the radial mode of the crystal and another at approximately 700 kilohertz which occurs in the thickness mode of the crystal. The output signal generated by the crystal upon particulate material striking housing 15 contains frequency components in both the 100 kilohertz range and the 700 kilohertz range. However, since the output signal of the crystal generated by normal flow, pump noise, and/or other extraneous noises striking housing 15 may also contain frequency components in the 100 kilohertz range, reliance upon the 700 kilohertz range is necessary to insure that particulate material is, in fact, present in the flow stream. Output signals from the crystal generated by normal flow, pump noise, etc., will not contain frequency components in the 700 kilohertz range. Although circuitry 30 forms no part of the present invention, a brief description of the circuitry will be set forth for a more complete understanding of the invention. For a more detailed description of circuitry 30, see copending application.

The output voltage $v_a$ of crystal 20 is tuned to 700 kilohertz and is fed through standard high band-pass filter 32 which is designed to pass a band of frequencies approximately 100 kilohertz wide, centered about said tuned frequency of the transducer, i.e., filter 32 will pass a band of frequencies from 650 to 750 kilohertz while attenuating all other frequencies. The typical output signal $v_b$ of filter 32 is illustrated in FIG. 5. The output signal $v_b$ of filter 32 is then amplified by amplifier 33 which may consist of one or more stages as is well known in the art. It should be recognized that filter 32 may be placed as shown or placed subsequent to amplifier 33 without changing its function or purpose or, further, it may take the form of a feedback loop which attenuates the lower frequencies as is well known in the art.

The filtered and amplified signal is next passed through rectifier 34 to convert the AC signal to a DC voltage signal whose magnitude is the averaged rectified version of the output of amplifier 33. The signal is then directly recorded on a conventional DC recorder 35 and/or is fed to alarm circuit 36 which warns an operator when a certain condition related to particulate material content exists in the flow stream. In the illustrated alarm circuit 36, the signal originated by probe means 12 is applied to comparator 37 in which it is compared to a reference voltage signal $v_r$ which, in turn, is representative of some desired particulate content condition in the flow stream. If the reference signal $v_r$ is exceeded by the processed signal, comparator 37 will provide an error signal which in turn triggers alarm 45.

From the above description, it is evident that the present invention provides a compact probe means which can be inserted into a flow stream for continuously monitoring particulate material content in said flow stream.

What is claimed is:

1. A means for detecting the presence of particulate material in a flow stream through a conduit, said means comprising:
   a probe means having a housing;
   acoustical transducer means freely suspended within said housing, said transducer means responsive to vibratory energy implied thereon to generate a signal corresponding to said energy;
   means in said housing for allowing said housing to be filled with a noncompressible fluid;
   means on said probe means adapted for positioning said housing directly into the flow stream through said conduit so that when said probe is in place within said conduit the flow stream will impinge directly onto said housing; and
   means attached to said acoustical transducer means and extending from said housing for providing an output of said signal from said transducer.

2. The detection means of claim 1 including:
   a noncompressible, nonconductive fluid filling said housing whereby said acoustical transducer means is effectively coupled to said housing.

3. The detection means of claim 2 wherein said acoustical transducer means comprises:
   a piezoelectric crystal responsive to those high frequencies generated by particulate material impinging on said housing.

4. The detection means of claim 3 wherein:
   said output means of said acoustical transducer means comprises an electrical lead which also serves as means to freely suspend said transducer means within said housing.

5. The detection means of claim 4 wherein:
   said housing is an elongated, cylindrical tube which is adapted to be positioned within said conduit with its elongated axis perpendicular to said flow stream.

6. The detection means of claim 5 including:
   a thin layer of wear-resistant material affixed to the outer surface of said housing.

7. The detection means of claim 5 wherein:
   said conduit is horizontal and wherein said transducer means is positioned at a distance within said cylindrical tube necessary to insure that said acoustical transducer means will lie in the lower portion of said conduit when said probe means is in an operable position within said conduit.

8. The detection means of claim 4 wherein:
   said piezoelectric crystal is in the shape of a circular disc and said piezoelectric crystal has a primary resonant frequency in its thickness mode in excess of 100 kilohertz.

9. The detection means of claim 8 wherein:
   said primary resonant frequency is approximately 700 kilohertz.

10. A probe means for detecting the presence of particulate material in a flow stream through a conduit, said probe means comprising:
    a thin-walled, elongated, cylindrical housing closed at one end;

a plug means closing said other end of said housing, said plug means having two openings therethrough, one of said openings providing a passage for filling said housing with a noncompressible fluid;

means normally closing said one opening;

an acoustical transducer means responsive to vibratory energy to generate an output signal;

output means attached to said acoustical transducer means for carrying said output signal to a point outside said housing, said output means extending through the other of said openings and providing means for freely suspending said transducer means within said housing; and means on said probe means for positioning said probe means in said conduit so that said housing is placed directly into said flow stream with the elongated axis of said housing perpendicular to said flow stream.

11. The probe means of claim 10 including:

a thin layer of wear-resistant material affixed to the outer surface of said housing.

12. The probe means of claim 11 wherein said acoustical transducer means comprises:

a piezoelectric crystal in the shape of a circular disc having a primary resonant frequency in its thickness mode in excess of 100 kilohertz.

13. The probe means of claim 12 wherein:

said primary resonant frequency is approximately 700 kilohertz.

14. The probe means of claim 13 including:

a noncompressible, nonconductive fluid filling said housing whereby said crystal is acoustically coupled to said housing.

15. A means for detecting particulate material in a flow stream comprising:

a housing;

acoustical transducer means freely suspended within said housing, said transducer means responsive to vibratory energy to generate a signal corresponding to said energy;

means in said housing for allowing said housing to be filled with a noncompressible liquid;

means adapted for positioning said housing in relation to said flow stream so that, when said housing is in an operable position, said transducer means is responsive to energy generated by particulate material in said flow stream; and output means for providing an output for said signal generated by said transducer means.

16. The detection means of claim 15 including:

a noncompressible, nonconductive liquid filling said housing whereby said acoustical transducer means is effectively coupled to said housing.

17. The detection means of claim 16 wherein said acoustical transducer means comprises:

a piezoelectric crystal responsive to those high frequencies generated by particulate material.

18. The detection means of claim 17 wherein:

said output means of said acoustical transducer means comprises an electrical lead which also serves as means to freely suspend said transducer means within said housing.

19. The detection means of claim 17 wherein:

said piezoelectric crystal is in the shape of a circular disc and said piezoelectric crystal has a primary resonant frequency in its thickness mode in excess of 100 kilohertz.

20. The detection means of claim 19 wherein:

said primary resonant frequency is approximately 700 kilohertz.

* * * * *

PO-1050
(5/69)

UNITED STATES PATENT OFFICE
CERTIFICATE OF CORRECTION

Patent No. 3,841,144          Dated October 15, 1974

Inventor(s) Willett F. Baldwin

It is certified that error appears in the above-identified patent and that said Letters Patent are hereby corrected as shown below:

Column 3, line 18, after "application" and before the period (.), --Serial No. 297,097, filed October 12, 1972-- has been omitted.

Column 4, line 40, after the period (.), --11b-- should be deleted;

line 45, before "in" --frequencies-- has been omitted.

Column 5, line 35, after "application" and before the period (.), --Serial No. 297,097, filed October 12, 1972-- has been omitted.

Signed and sealed this 31st day of December 1974.

(SEAL)
Attest:

McCOY M. GIBSON JR.          C. MARSHALL DANN
Attesting Officer             Commissioner of Patents